United States Patent

[11] 3,591,897

| [72] | Inventor | Henry A. Perras<br>Easthampton, Mass. |
|---|---|---|
| [21] | Appl. No. | 772,773 |
| [22] | Filed | Nov. 1, 1968 |
| [45] | Patented | July 13, 1971 |
| [73] | Assignee | Osley & Whitney, Inc.<br>Westfield, Mass. |

[54] RUNNERLESS MOLD FOR AUTOMATED INJECTION-MOLDING OF THERMOSET MATERIALS
13 Claims, 5 Drawing Figs.

[52] U.S. Cl. .................................................. 18/30 HM,
        18/30 NA, 18/30 RC, 18/42 D, 18/DIG. 9
[51] Int. Cl. .................................................. B29f 1/08
[50] Field of Search ........................................ 18/30 HM,
        30 HQ, 30 NM, 30 RC, 30 RH, 42 D, DIG. 9;
        249/111

[56] References Cited
UNITED STATES PATENTS

| 2,911,680 | 11/1959 | Kelly | 18/30 (NEF) |
|---|---|---|---|
| 3,103,039 | 10/1963 | Robinson | 18/30 (RC) |
| 3,113,346 | 12/1963 | Bright | 18/30 (RH) |
| 3,393,428 | 7/1968 | Kowalski | 18/42 (D) |

FOREIGN PATENTS

| 400,553 | 10/1965 | Switzerland | 18/42 (D) |

OTHER REFERENCES
Levine; Alfred B.

Primary Examiner—William S. Lawson
Attorneys—Robert S. Smith, David S. Urey and Alan C. Rose and Alfred B. Levine ABSTRACT: The invention contemplates a mold system primarily useful for thermoset plastics, in the context of producing multiple parts with injection-molding machines. The mold comprises mechanically separable parts or subassemblies for purposes of opening and closing the mold; the mold also comprises thermodynamically isolated regions or zones whereby curing heat is supplied to the mechanically separable parts which define the mold cavity, and cooling or lesser heat is provided for the sprue and runner system to assure non-curing conditions for injected plastic that has yet to reach the cavity regions. The sprue-and-runner-system includes a specially cooled secondary sprue associated with each independent mold cavity.

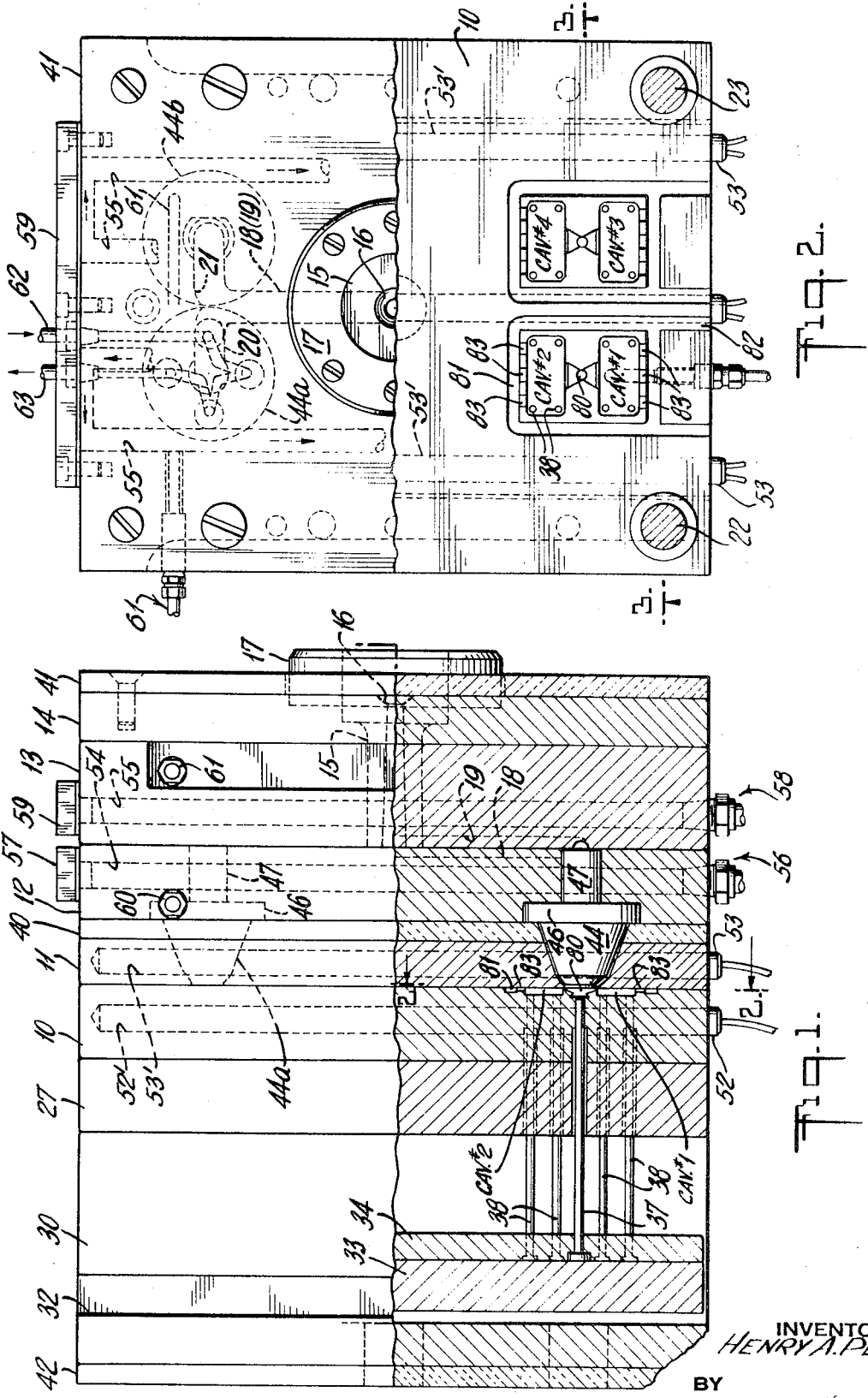

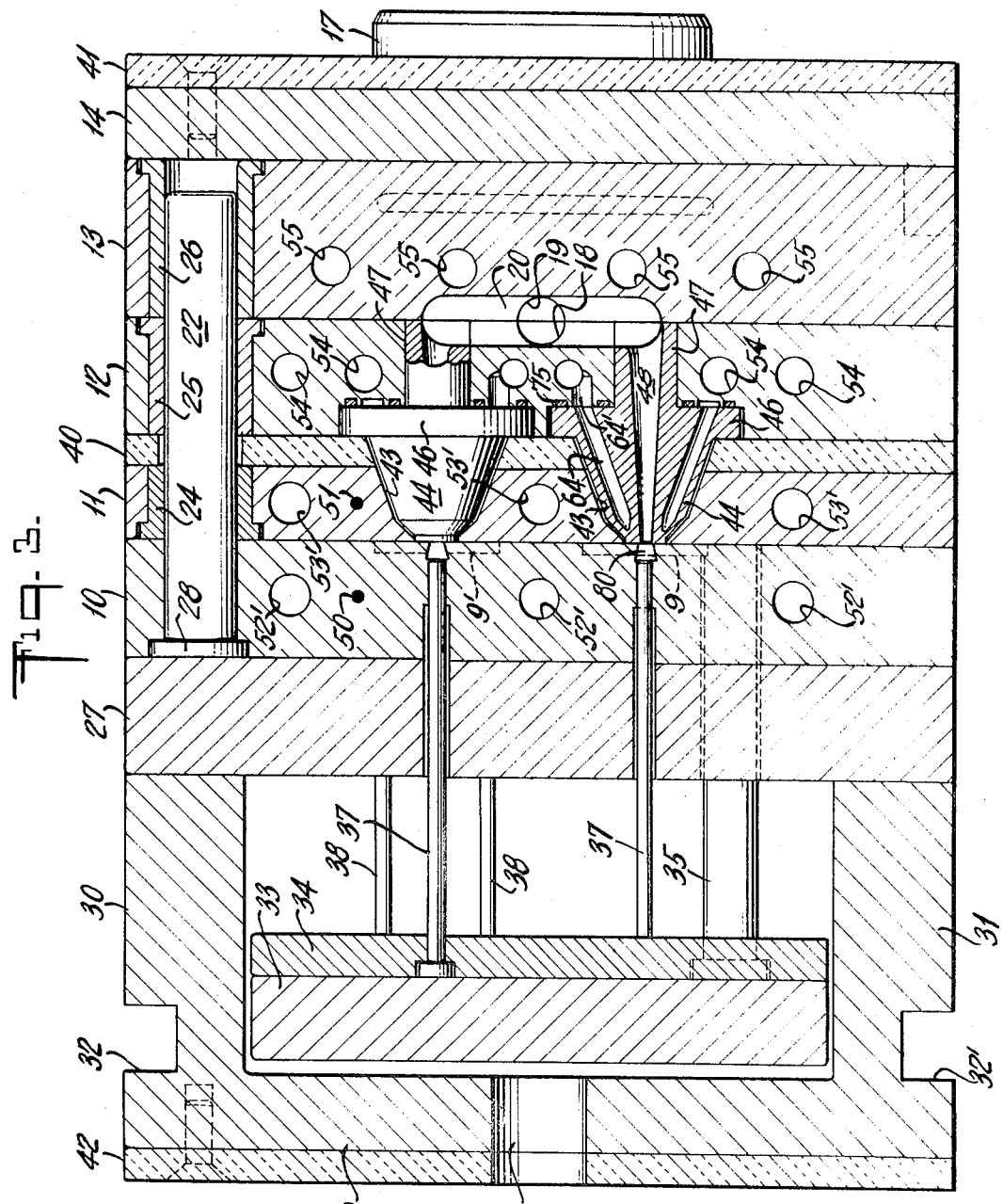
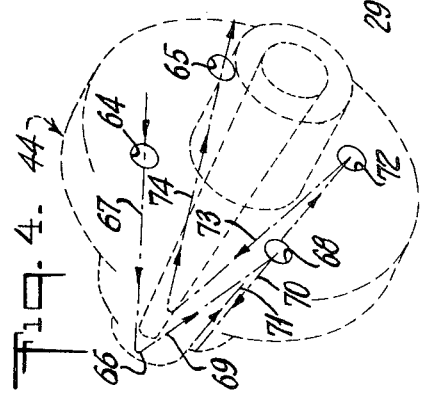
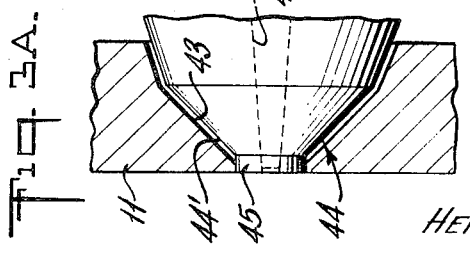
INVENTOR
HENRY A. PERRAS
BY
Hopgood & Calimafde
ATTORNEYS

RUNNERLESS MOLD FOR AUTOMATED INJECTION-MOLDING OF THERMOSET MATERIALS

This invention relates to an improved mold construction for use with plastics injection-molding machines, particularly in connection with thermoset plastics materials.

Conventionally, thermosetting plastics have been used with molds in which runner passages distribute the injected liquid plastic material from a central sprue to each of the various cavities that happen to characterize the particular mold. The nature of the plastic is that heat and pressure must be supplied after injection, in order that the injected liquid plastic may become cured to solid state, and this of course means that the runner materials are similarly cured, to establish the familiar tree by which multiple-molded parts are united when ejected after curing. The tree materials are waste, in that they cannot be reused, and there is an undesirable operation involved in cleanly severing the desired parts from the tree.

It is, accordingly, an object of the invention to provide an improved mold construction which will avoid the curing of runner materials.

A specific object is to meet the foregoing object with a mold construction in which injected materials are cured essentially only at the mold cavities and in which all sprue, runner or other supply-line connections accommodate uncured injected plastic during the injection, curing and ejection phases of the molding cycle, thereby avoiding or at least substantially minimizing the wastage of injected liquid plastic material.

Another specific object is to provide an improved multiple-cavity mold for thermoset materials characterized by adjacent discrete thermal zones which on the one hand will effect curing and on the other hand will not effect curing, the interface between such zones being substantially at the injection edge for each mold cavity.

It is a general object to meet the above objects with a mold construction which will enable (a) the automated injection-molding of thermoset materials in plural parts for each cycle, (b) with inherent parts-separation upon ejection, (c) with maximum use of injected material in the parts produced, (d) without generating a hardened plug at the start of each injection, and (e) requiring minimum post-molding operations on ejected parts.

Other objects and various further features of novelty and invention will be pointed out or will occur to those skilled in the art from a reading of the following specification in conjunction with the accompanying drawings. In said drawings, which show; for illustrative purposes only, a preferred form of the invention:

FIG. 1 is a view in side elevation of a multiple-cavity mold of the invention, partly broken-away and in section in a plane through two cavities of the mold;

FIG. 2 is a right-end view of the mold of FIG. 1, certain parts being broken-away to show an interior mold face, revealing four of the cavities of the mold at the line 2—2 of FIG. 1;

FIG. 3 is an enlarged sectional view along the line 3—3 of FIG. 2;

FIG. 3A is an enlarged fragmentary sectional view in the plane of FIG. 3; and

FIG. 4 is a somewhat schematic isometric diagram of cooling provisions in a secondary sprue utilized in the mold of FIGS. 1 to 3.

Briefly stated, the invention contemplates a mold system primarily useful for thermoset plastics, in the context of producing multiple parts with injection-molding machines. The mold comprises mechanically separable parts or subassemblies for purposes of opening and closing the mold; the mold also comprises thermodynamically isolated regions or zones whereby curing heat is supplied to the mechanically separable parts which define the mold cavity, and cooling or lesser heat is provided for the sprue and runner system to assure noncuring conditions for injected plastic that has yet to reach the cavity regions. The sprue-and-runner system includes a specially cooled secondary sprue associated with each independent mold cavity.

Referring to the drawings, the invention is shown in application to a mold system characterized by a stacked plurality of flat plates, i.e., mold-body elements with parallel opposed front and back surfaces. The principal members comprise a first body element or cavity plate 10 (having plural cavity systems, designated generally 9—9 in FIG. 3), a second body element or force plate 11, a third body element or bottom runner plate 12, and a fourth body element or top-runner plate 13. Other body elements or plates complete the mold-system assembly, serving as adjuncts or accessories to the four named body elements.

On the injection side, these other body elements include a support plate 14 having a central bore which receives and retains a primary sprue bushing 15. Bushing 15 has a suitably concaved mouth or socket 16 to fit the similarly formed front contour of the injection nozzle (not shown) of a conventional plastics injection-molding machine. A mounting boss or hub 17 secured to the plate 14 positively locates the sprue bushing 15, which is shown extending through the bodies of both plates 13—14. The bore of sprue 15 discharges into a runner system defined by matching primary grooves 18—19 in the adjacent surfaces of the runner plates 12—13; these runner grooves branch, as at 20—21, to individually serve the various cavity systems of the mold. Spaced guide pins 22—23 are carried by the cavity plate and extend through aligned bores in plates 11—12—13 to maintain registry; self-lubricating bushings 24—25—26 line these bores to assure smooth action when the mold is opened by parting at the interface between plates 10—11.

At the cavity end of the mold system, a mold base or guide plate 27 is removably secured (by means not shown) to the back side of the cavity plate 10, thus securely retaining in place the adjacent headed ends 28 of the guide pins 22. The base 27 also carries a bridge consisting of a back plate 29 between two spaced pedestals 30—31 which are shown formed with grooves 32—32 for receiving mold-opening and closing forces from a suitable actuator (not shown). Within the bridge structure, a subassembly of an ejector plate 33 and pin plate 34 is reciprocably guided on supporting pin structure such as the return pin 35 which is received in suitable guide bores or bushings in plates 10—27. It will be understood that a longitudinally actuated knockout pin (not shown), forming part of the mold-actuator mechanism of the injection-molding machine, may be received through a tail opening 36 in bridge 29 for actuating abutment with the ejector plate 33, when the mold is open, and that the length of return pins (35) is such as to return plates 33—34 to rear position as the front face of force plate 11 intercepts them during a mold-closing operation. Various knockout pins 37—38 carried by plates 33—34 are aligned to enter the mold cavities, for parts removal in response to ejecting actuation by the knockout pin via opening 36.

As has been generally indicated above, the objects of the invention are achieved by delineating controlled thermal zones which establish thermoset-curing conditions in the cavity regions and noncuring conditions in the supply system right up to each of the cavity regions, i.e., to the mold parting line. In the form shown, a layer 40 of insulating material, which may be asbestos sheet, is sandwiched between plates 11—12, to clearly define a relatively hot or curing zone in the mold plates 10—11 and a relatively cool or intermediate noncuring zone in the sprue and runner system plates 12—13. For safety in handling, and in order not to establish the mold clamp (not shown) as a heat sink, I prefer to apply similar insulation sheets or panels 41—42 to the respective end faces of the mold system.

The described thermal insolation between the mold system and the sprue and runner system is maintained for substantially the entire thickness of the force plate 11, by so forming supply ports, as at 43, and secondary sprue bushings, as at 44, that continuous clearance between them is established, substantially to the front surface of plate 11. The secondary sprue bushing is shown as generally conical with a short projecting cylindrical tip 45 which locates in the shallow constricting end of port 43. The axial positioning of bushing 44 is determined by the seating of its base radial flange 46 in a suitable recess or counterbore in the bottom runner plate 12. Bushing 44 includes a reduced cylindrical tail 47, fitting a through-bore in plate 12. Its sprue passage 48 extends longitudinally to its flat-surfaced tip end which is preferably flush with the mold parting line or interface between mold plates 10–11. Preferably, the conical taper of bushing 44 is blunted by a relatively steep secondary taper 44' near the tip end 45, being characterized by an included angle in the order of a right angle. The port 43 is similarly contoured, to establish and maintain an air gap or thermal barrier between bushing 44 and plate 11 at all regions of their axial overlap, except substantially at the front or mold surfaces of plates 10–11.

The described conical shape of bushing 44 assures a predominant direction of heat transfer via the body of bushing 44 and away from the small tip end, for heat-sinking dissipation into and through the more-massive body of the bottom runner plate 12. By the same token, the tapering contour of port 43 assures efficient and substantially uniform transfer of heat from the main body of force plate 11 up to the periphery of the constricted end of tip 43. Moreover, it will be noted that the cylindrical area of tip contact at 45–11 is of relatively small axial extent so that no substantial heat-sinking effects are imparted by the sprue bushing 44 on the force plate 11. Stated in other words, independent heat control to the curing and to the noncuring zones, respectively, is achievable with negligible heat-sinking or transfer effects at their extremely limited region of direct contact.

To establish and maintain the desired heat differentials for regionally establishing curing and noncuring environments, the sprue and runner system is provided with "cooling" (i.e., intermediate-level heating) mechanism including temperature-probing devices to assure control. In similar fashion, the mold-plate system is provided with its heating mechanism including further temperature-probing devices. It will be understood that the expressions "heating" and "cooling," as used herein, are relative terms to signify thermoset-curing temperatures and noncuring temperatures, respectively. The actual desired temperatures will vary for particular plastics materials, mold configurations, shot sizes, and cycle times; and, in fact, the "cooling" or relatively cool function may involve the controlled addition of heat (above ambient), such addition being merely of lesser extent than the further heat required for curing the thermoset.

In the form shown, each of the mold plates 10–11 has its own heating means and its own temperature-following probe, such as a thermocouple having its sensitive element or end embedded within the plate body and in the vicinity of a mold cavity; such embedment and placement are schematically suggested in FIG. 3 by a heavy dot 50 for the thermocouple to track temperature within cavity plate 10, and by a heavy dot 51 for the thermocouple to track temperature within force plate 11. These thermocouples will be understood to be part of separate control systems (not further shown) for regulating the heat supplied by electric heaters to the respective plates 10–11 to achieve curing conditions. Such heaters may be of the cartridge type, such as heaters 52 received in transverse passages 52' in plate 10, and heaters 53 in similar passages 53' in plate 11.

On the cooling or noncuring side of the mold system, the bottom-runner plate 12 is provided with plural transverse passages 54, and the top-runner plate 13 is similarly provided at 55. For the case of plate 12, inlet and outlet liquid "coolant" connections are established as at one end 56 of passages 54, the other ends of these passages being manifolded by cap means 57. In similar fashion, the coolant passages 55 for plate 13 are provided with inlet and outlet connections at one end 58, while the opposite ends are capped at 59; the directional flow of coolant in plate 13 is representative and is shown by heavy dashed arrows in FIG. 2. A thermocouple element 60 in the body of plate 12 tracks temperature and will be understood to be part of automatic regulating mechanism to maintain a selected cooling or noncuring temperature through control of the temperature of "coolant" pumped in passages 54. Similar thermocouple means 61 forms part of the temperature-regulating system for coolant circulated in passages 55.

As a further feature of the invention, continuous flow of coolant is also circulated in the body of each of the several secondary sprue bushings 44, and the region or course served by such circulation extends both axially and circumferentially of the bushing bore or sprue, and virtually to the tip end thereof. FIG. 4 illustrates a preferred manner of achieving such circulation, using plural intersecting drilled passages, served by inlet and exhaust connections 62–63 (FIG. 2) which deliver supply coolant at a first drill bore 64 and remove exhaust coolant at a last drill bore 65. A first axially extensive (and limited arcuate) leg within bushing 44 is defined by intersection at 66 (near the tip end) between a first drill bore through inlet 64 and on the alignment 67, which is preferably angularly cocked or offset from a plane through the sprue axis and which also converges toward the sprue axis; the intersecting leg is made through another opening 68 and on the alignment 69, which has an opposite direction of angular offset from such plane and which also converges toward the sprue axis. Similar intersecting bores 70–71 are made through the next adjacent pair of openings 68–72, and further intersecting bores 73–74 are made through the last adjacent pair of openings 72–65. Resilient O-rings, as at 75–76, located in annular grooves in the flat bottom of the recess (of plate 12) which accommodates the flange 46 of the sprue bushing 44 are compressed when bushing 44 is secured in place, thus establishing peripheral seals or caps over the openings 68–72, and seals to the inlet and exhaust passages (as at 64'–64''') serving the circulating system for the bushing 44. Coolant flow is thus directed via the end connections 62–63 exclusively to serve the single secondary sprue bushing 44, and it will be understood that the temperature probe 61 for the force plate 12 may equally well serve for control of temperature of coolant supplied in the described bushing-passage system.

For relatively large-size mold cavities, each secondary sprue bushing may serve a single cavity, in which case the break between cured and uncured injected plastic may be caused to take place at the surface of the molded part, meaning that no further secondary operation is necessary on completed molded parts, once ejected upon mold-opening. For relatively small-size mold cavities, each secondary sprue bushing may still serve a single mold cavity, but economy is realized when more than one cavity is served by each secondary sprue bushing. In the form shown, two mold cavities are served by each secondary sprue bushing, and there are four such bushings 44 served by the runner system from the primary sprue 15. The mold system shown thus produces eight parts for each injection-and-curing cycle.

The described dual-cavity arrangement is best illustrated in the lower (broken-away) halves of FIGS. 1 and 2, wherein "CAV. 01" and "CAV. 02" are seen to designate the two cavities served by the left-hand (in the FIG. 2 sense) secondary sprue bushing 44 (FIG. 1), and wherein "CAV. 03" and "CAV. 04" apply for the corresponding right-hand secondary sprue bushing (not shown). Similar pairs of cavities are served by the third and fourth secondary sprue bushings 44a and 44b, for which dashed flange outlines are shown in FIG. 2.

For each dual-cavity cluster, the secondary sprue discharge is direct to a small gate 80 having short fan-shaped channels to distribute injected material over thin dams to both mold cavities, "CAV. 01" and "CAV. 02." Gas (air) venting is provided by a manifold channel or moat 81 which surrounds the cavity cluster and is open at 82 to the atmosphere; plural bleeds 83 vent each cavity to the manifold 81.

In a representative employment of the described mold system, shots of 31.5 grams of medium-heat resistance mineral-filled phenolic were produced on a continuous basis at a cycle time of 29.5 seconds, meaning that 16 finished parts were delivered, in gate-connected dual clusters, every minute. Once each finished part was ejected, the system was immediately operative, on mold-closure, to receive the next injection, without spoilage due to any plug or partially cured residue at the secondary-sprue orifices; moreover, no cleanout or purge of the sprue was needed between cycles. In the heating (curing) zones of mold plates 10-11, temperature was maintained at 350° F., and the "coolant" (water) was held to 220° F. at 80 p.s.i. when circulated in the runner plates 12-13 and in the secondary sprue bushings. The injection-molding machine was operated in standard fashion, synchronized with mold-opening and mold-closing, there being a slight retracting displacement of the injecting cylinder (to relieve pressure and avoid drool) after curing and immediately prior to mold-opening. The finished parts were readily separated by snapping the gates therefrom; the gate material represented the only waste or scrap, which, of course, is not in any respect involved when injection is made directly into the mold cavity, as for larger pieces.

While the invention has been described in detail for the preferred form shown, it will be understood that modifications may be made without departing from the scope of the invention as defined in the claims.

What I claim is:

1. In a mold of the character indicated, a first mold-body element having a mold cavity open to one side thereof, a second mold-body element selectively movable into adjacency with said side to open and close the cavity, said second body element having an injection port communicating with the cavity when the mold is closed, a third mold-body element including injection-supply passage means extending into and substantially through said port, thermal-insulation means between said second and third body elements, heating means for said first and second body elements for establishing thermoset-curing conditions therein, and cooling means in said third body element for establishing noncuring conditions for material in said passage means, that part of said passage means which extends into said port comprising a head having a central passage for conduct of injected material directly to the mold cavity, said head having a further passage independent of and substantially surrounding the central passage and forming part of said cooling means, said further passage extending in an undulating course that is both generally axial and generally circumferential with respect to the central passage.

2. The mold of claim 1 wherein the undulating course of said further passage extends substantially through the port in said second body element.

3. In a mold of the character indicated, a first mold-body element having a mold cavity open to one side thereof, a second mold-body element selectively movable into adjacency with said side to open and close the cavity, said second body element having an injection port communicating with the cavity when the mold is closed, a third mold-body element including injection-supply passage means extending into and substantially through said port, thermal-insulation means between said second and third body elements, heating means for said first and second body elements for establishing thermoset-curing conditions therein, and cooling means in said third body element for establishing noncuring conditions for material in said passage means, that part of said passage means which extends into said port comprising a head having a central passage for conduct of injected material directly to the mold cavity, said head having a further passage independent of and substantially surrounding the central passage and forming part of said cooling means, said head being generally conical about the central passage and said port being relatively constricted at the surface of said second body element which is adjacent the mold cavity, said head having limited piloting engagement with said second body element only at the constricted end of said port.

4. The mold of claim 3, wherein said head includes a radially outward flange at the base of its generally conical shape and wherein said third body element is locally concave to receive and locate said flange, and means clamping into unit-handling relation said second and third body elements and said thermal-isolation means.

5. A cold-runner thermoset mold, comprising, a first mold-body plate element having parallel front and back surfaces with plural mold cavities open to said front surface, a second mold-body plate element having parallel front and back surfaces and a separate injection port communicating with each cavity when said front surfaces are juxtaposed, means including guide means coacting between said body elements for selectively placing said body elements in and out of juxtaposed relation for opening and closing the mold cavity, a third mold-body plate element having parallel front and back surfaces, a layer of thermal insulation having parallel front and back surfaces and located between otherwise adjacent back surfaces of said second and third body elements, said plate elements and said layer having substantially coextensive overlapped areas, means securing said second and third body elements to each other and against opposite sides of said insulation layer, said third body element including injection-supply passage means including a separate secondary sprue extending into and substantially through each said port, separate thermodynamic supply means for each of said body elements, the thermodynamic supply to said first and second body elements being at such level as to establish thermoset-curing conditions therein, the thermodynamic supply to said third body element being at such level as to establish noncuring conditions for thermoset material in said third body element, and a single sprue and runner system serving said secondary sprues.

6. The mold of claim 5, and including a fourth body element having parallel front and back surfaces one of which is secured to the otherwise exposed surface of said third body element, said sprue and runner system comprising a sprue passage in said fourth body element and runner passages at the interface between said third and fourth body elements.

7. The mold of claim 6, in which said fourth body element includes thermodynamic-supply means at such level as to establish noncuring conditions for material in said fourth body element.

8. The mold of claim 5, in which said respective thermodynamic-supply means comprise separate heat-supply means to each of said first and second plate elements and separate cooling-supply means to said third plate element.

9. A demountable cold-runner mold established by a single stack of flat plates, comprising a first pair of mold-cavity plates, a second pair of runner-manifold plates, and a layer of thermal insulation with parallel front and back surfaces spacing said first pair from said second pair; said first pair having plural mold cavities defined at the adjacent surfaces of the plates thereof, the first-pair plate adjacent said insulation layer having a separate injection port at each mold-cavity location, said insulation layer having an aperture in register with each of said ports; said second pair having a runner-groove system defined at the adjacent surfaces of the plates thereof, the second-pair plate adjacent said insulation layer having separate injection ports in register with corresponding ports and apertures of said layer and first pair of separately communicating with said runner-groove system, the other second-pair plate having primary sprue means communicating with said runner-groove system, and plural secondary-sprue means carried by said first-mentioned mentioned second-pair plate and projecting through said layer and ports into discharging adjacency with the respective mold cavities; heating means for each of the plates of said first pair, and cooling means for each of the plates of said second pair.

10. A mold according to claim 9, in which said cooling means includes a liquid-coolant system.

11. A mold according to claim 9, in which said cooling means includes cooling means for said secondary-sprue means.

12. A mold according to claim 11, in which said secondary-sprue means comprises, at each port location, a centrally apertured body mounted on the first-mentioned plate of said second pair and positioned in clearance relation with the associated port.

13. A mold according to claim 12, in which the secondary-sprue cooling means comprises a liquid-coolant circulating system around the central sprue aperture and substantially overlapping the axial extent thereof.

PO-1050
(5/69)

UNITED STATES PATENT OFFICE
CERTIFICATE OF CORRECTION

Patent No. 3,591,897               Dated    September 12, 1972

Inventor(s)     Henry A. Perras

It is certified that error appears in the above-identified patent and that said Letters Patent are hereby corrected as shown below:

In the Abstract:
    Line 3, after "machines" cancel "," and insert --.--.
In the Specification:
    Column 2, line 8, "9-9" should read --9-9'--.
    Column 2, line 39, "32-32" should read --32-32'--.

Column 4, line 58, "CAV.01" should read --CAV.#1--.
    Column 4, line 58, "CAV.02" should read --CAV.#2--.
    Column 4, line 61, "CAV.03" should read --CAV.#3--.
    Column 4, line 62, "CAV.04" should read --CAV.#4--.
    Column 4, line 69, "CAV.01" should read --CAV.#1--.
    Column 4, line 69, "CAV.02" should read --CAV.#2--.

Signed and sealed this 20th day of March 1973.

(SEAL)
Attest:

EDWARD M. FLETCHER, JR.            ROBERT GOTTSCHALK
Attesting Officer                   Commissioner of Patents